United States Patent
Chhatriwala et al.

(10) Patent No.: US 6,725,060 B1
(45) Date of Patent: Apr. 20, 2004

(54) METHOD AND APPARATUS FOR CONSERVING POWER IN AN INTEGRATED ELECTRONIC DEVICE THAT INCLUDES A PDA AND A WIRELESS TELEPHONE

(75) Inventors: Murtuza T. Chhatriwala, San Diego, CA (US); Clarence C. Wong, Encinitas, CA (US); Ronald J. Menelli, Carlsbad, CA (US); Christine Burke, San Diego, CA (US); Stephen A. Sprigg, Poway, CA (US); Marc A. Weiss, Coto de Caza, CA (US); Jason B. Kenagy, San Diego, CA (US); Jeffrey A. Pritchard, Vista, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/504,244

(22) Filed: Feb. 15, 2000

(51) Int. Cl.7 .................................................. H04M 1/00
(52) U.S. Cl. ............................... 455/556.2; 455/556.1; 340/7.2; 340/7.32
(58) Field of Search .................................. 455/574, 572, 455/557, 66, 550.1, 575.1, 90.3, 556.1, 556.2; 340/7.2, 7.32

(56) References Cited

U.S. PATENT DOCUMENTS

| | | | |
|---|---|---|---|
| 4,731,814 A | | 3/1988 | Becker et al. ................. 379/62 |
| 5,396,443 A | | 3/1995 | Mese et al. .................. 364/707 |
| 5,594,951 A | * | 1/1997 | Bellin .......................... 455/127 |
| 5,797,089 A | * | 8/1998 | Nguyen ....................... 455/403 |
| 5,924,044 A | * | 7/1999 | Vannatta et al. ........ 379/433.05 |
| 5,983,073 A | * | 11/1999 | Ditzik ......................... 455/11.1 |
| 6,131,166 A | * | 10/2000 | Wong-Insley ............... 709/328 |
| 6,292,181 B1 | * | 9/2001 | Banerjee et al. ............ 345/179 |

* cited by examiner

Primary Examiner—Vivian Chin
Assistant Examiner—Lewis G. West
(74) Attorney, Agent, or Firm—Philip R. Wadsworth; Charles D. Brown; Nicholas J. Pauley

(57) ABSTRACT

A system and method for reducing power consumed by an integrated electronic device. The device includes a personal data assistant (PDA) unit and a wireless telephone integrated in a common housing. A common display on the housing is used for displaying messages from both the PDA and the wireless telephone to a user. A controller, coupled to the wireless telephone, places the wireless telephone in a power-off state after expiration of a predetermined period of time following cessation of voice traffic activity on the wireless telephone. The controller switches the wireless telephone from the power-off state to a power-on state if, during operation in the power-off state, a user begins an attempt to place an outgoing call with the wireless telephone. The wireless telephone is unable to receive an incoming call when the wireless telephone is in the power-off state. However, the PDA is operable to receive information from the user through the display and display information to the user on the display when the wireless telephone is in the power-off state.

4 Claims, 2 Drawing Sheets

METHOD AND APPARATUS FOR CONSERVING POWER IN AN INTEGRATED ELECTRONIC DEVICE THAT INCLUDES A PDA AND A WIRELESS TELEPHONE

BACKGROUND OF THE INVENTION

I. Field of the Invention

The present invention relates generally to portable electronic devices that include a wireless telephone. More particularly, the present invention relates to a method for reducing power consumption in an integrated electronic device that includes a personal data assistant (PDA) that has been integrated in a common housing with a wireless telephone.

II. Description of the Related Art

Personal data assistants (or PDAs) are well known in the art. Among other things, these devices allow users to run many applications such as personal scheduling programs, address books, games, and notepad programs, on a computer that is sized to fit in a user's hand. These devices also may include open operating platforms that allow users to program or configure the PDAs themselves.

Wireless telephones are also well known in the art. Such devices typically operate in the cellular or PCS bands, and use technologies such, e.g., code division multiple access or time division multiple access for communication between the wireless telephone and a base station. Some wireless telephones also include pagers that are integrated within the telephone unit. In these units, text messages and other messages such as missed call indication messages may be received in the telephone's pager from a base station and displayed to the user on the telephone display.

In order to conserve battery power, some wireless telephones function in a "standby" mode when active voice traffic is not being transmitted between the wireless telephone and a base station. During the standby mode, a receiver in the wireless telephone monitors a channel, such as for example a paging channel, that is used to signal an incoming call to the wireless telephone. Upon receipt of an incoming call (or initiation of an outgoing call by the user), the wireless telephone exits the standby mode and activates the features necessary to support voice traffic between the telephone and a base station. Significantly, during the standby mode the wireless telephone still consumes battery power (which may be used among other things to monitor a paging channel), although power is used more slowly in the standby mode than when active voice communications are being supported on the wireless telephone.

Currently, PDAs and wireless telephones are being provided to users as a single integrated unit. In these products, a PDA and a wireless telephone are disposed in a single housing and use a common display (e.g., LCD display) for communication with the user. In addition, in such units the wireless telephone and the PDA are configured such that a user may program the wireless telephone using the open operating platform of the PDA. In these units, the PDA and the wireless telephone are typically configured to allow data, e.g., fax or data information, to be transferred between the PDA and the wireless telephone. Current products that include both a PDA and a wireless telephone as an integrated unit include the PDQ™800 and PDQ™1900 units sold by Qualcomm, Inc.

One problem with existing units that include a combination of a PDA and a wireless telephone is the conservation of battery life. Given that a single battery is typically used to power both the PDA and the wireless telephone, the power demands on the battery can be significant. It is an object of the present invention to provide a system for conserving battery power in such systems, thereby extending the battery life of the units and minimizing the need for recharging of batteries used to power such units.

SUMMARY OF THE INVENTION

The present invention is directed to a system and method for reducing power consumed by an integrated electronic device. The device includes a personal data assistant (PDA) unit and a wireless telephone integrated in a common housing. A common display on the housing is used for displaying messages from both the PDA and the wireless telephone to a user. A controller, coupled to the wireless telephone, places the wireless telephone in a power-off state after expiration of a predetermined period of time following cessation of voice traffic activity on the wireless telephone. The controller switches the wireless telephone from the power-off state to a power-on state if, during operation in the power-off state, a user begins an attempt to place an outgoing call with the wireless telephone. The wireless telephone is unable to receive an incoming call when the wireless telephone is in the power-off state. However, the PDA is operable to receive information from the user through the display and display information to the user on the display when the wireless telephone is in the power-off state.

In accordance with a further aspect, the wireless telephone includes a pager that is unable to receive incoming pages when the wireless telephone is in the power-off state. In this embodiment, upon transition from a previous power-off state to a current power-on state, information representative of pages sent to the wireless telephone between cessation of a previous power-on state and initiation of the current power-on state are provided to the user. In a particularly preferred embodiment, the predetermined period of time used for initiation of the power-off state is user selectable and may be either 30 minutes, 60 minutes and 120 minutes. Alternatively, the user is given the option not to activate the power-off feature on the wireless telephone.

The PDA preferably has its own sleep mode that is invoked independently of the current state of the wireless telephone (e.g., power-off state or power-on state). In one embodiment, the PDA has a sleep mode that is invoked by an operating system associated with the PDA after a predetermined period of time following cessation of activity on the PDA. The predetermined period of time used to invoke the sleep mode is preferably user selectable and, in one embodiment, may be either 1, 2, 3, 5 or 15 minutes. Alternatively, the user is given the option not to activate the sleep feature on the PDA.

BRIEF DESCRIPTION OF THE DRAWINGS

The features, objects and advantages of the present invention will become more apparent from the detailed description set forth below when taken in conjunction with the drawings in which like reference characters identify corresponding elements and wherein.

DETAILED DESCRIPTION OF THE PREFERRED EMBODIMENTS

Figure 1:
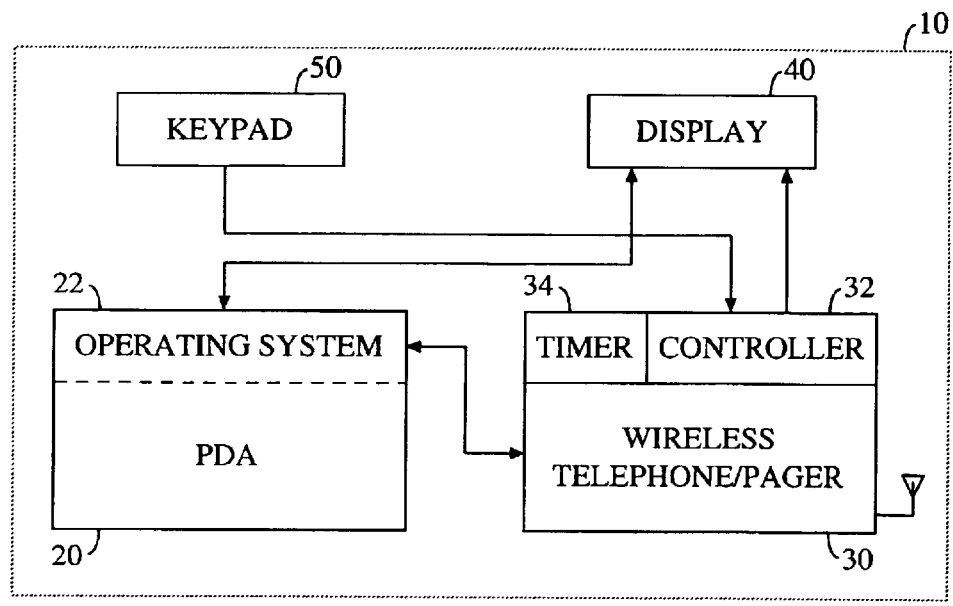
FIG. 1 is a block diagram of a block diagram showing the components of an integrated electronic device that includes a PDA and a wireless telephone, in accordance with a preferred embodiment of the present invention.

Referring now to FIG. 1, there is shown a block diagram of an integrated electronic 10 device that includes a PDA 20 and a wireless telephone 30, in accordance with a preferred embodiment of the present invention. PDA 20 and wireless telephone 30 are integrated in a common housing (not shown). A common display 40 on the housing is used for displaying messages from both the PDA and the wireless telephone to a user. A user uses the display 40 to input information to the PDA, and uses keypad 50 provided on the housing to input information to the wireless telephone. A controller 32, coupled to the wireless telephone, places the wireless telephone in a power-off state after expiration (as determined by timer 34) of a predetermined period of time following cessation of voice traffic activity (i.e., active voice communications between the wireless telephone and a base station) on wireless telephone 30. In the power-off state, no battery power is provided to any of the components used for operating wireless telephone 30. Thus, in contrast to the "standby" mode describe above, no paging channel is monitored by wireless telephone 30 when the telephone is in the power-off state. Thus, wireless telephone 30 is unable to receive an incoming call when wireless telephone 30 is in the power-off state. However, PDA 20 is operable to receive information from the user through the display 40 and display information to the user on the display 40 when wireless telephone 30 is in the power-off state.

The controller 32 switches wireless telephone 30 from the power-off state to a power-on state if, during operation in the power-off state, a user begins an attempt to place an outgoing call with the wireless telephone. In some embodiments, this transition to the power-on state will occur, for example, if the user begins inputting a telephone number onto keypad 50 or if the user attempts to place a call after inputting a number or recalling a number from memory by pressing a SEND key (also not shown) on keypad 50. It will be understood by those skilled in the art that other user activity associated with wireless telephone 30 can be used to trigger the transition from the power-off state to the power-on state.

In a particularly preferred embodiment, wireless telephone 30 includes a pager that is also unable to receive incoming pages when wireless telephone 30 is in the power-off state. In this embodiment, upon transition from a previous power-off state to a current power-on state, information representative of pages sent to the wireless telephone between cessation of a previous power-on state and initiation of the current power-on state are provided to the user. In a particularly preferred embodiment, the predetermined period of time used for initiation of the power-off state is user selectable and can be programmed by the user through operating system 22 on PDA 20. In one embodiment, operating system 22 gives the user the option to set the period of time used for initiation of the power-off state following cessation of voice activity at either 30 minutes, 60 minutes and 120 minutes. Alternatively, operating system 22 may give the user the option not to activate the power-off feature on wireless telephone 30.

PDA 20 preferably has its own sleep mode that is invoked independently of the current state of the wireless telephone 30 (e.g., power-off state or power-on state). In one embodiment, PDA 20 has a sleep mode that is invoked by operating system 22 after a predetermined period of time following cessation of activity on PDA 20. The predetermined period of time used to invoke the sleep mode is user-selectable and, in one embodiment, may be either 1, 2, 3, 5 or 15 minutes. Alternatively, the user is given the option not to activate the sleep mode feature on PDA 20. In the sleep mode, power is provided only to the PDA timer in the PDA, and no power is provided to the remaining components associated with the PDA. The PDA will awaken out of its sleep mode when, for example, a user attempts to input a command into PDA 20 through display 40.

Figure 2:
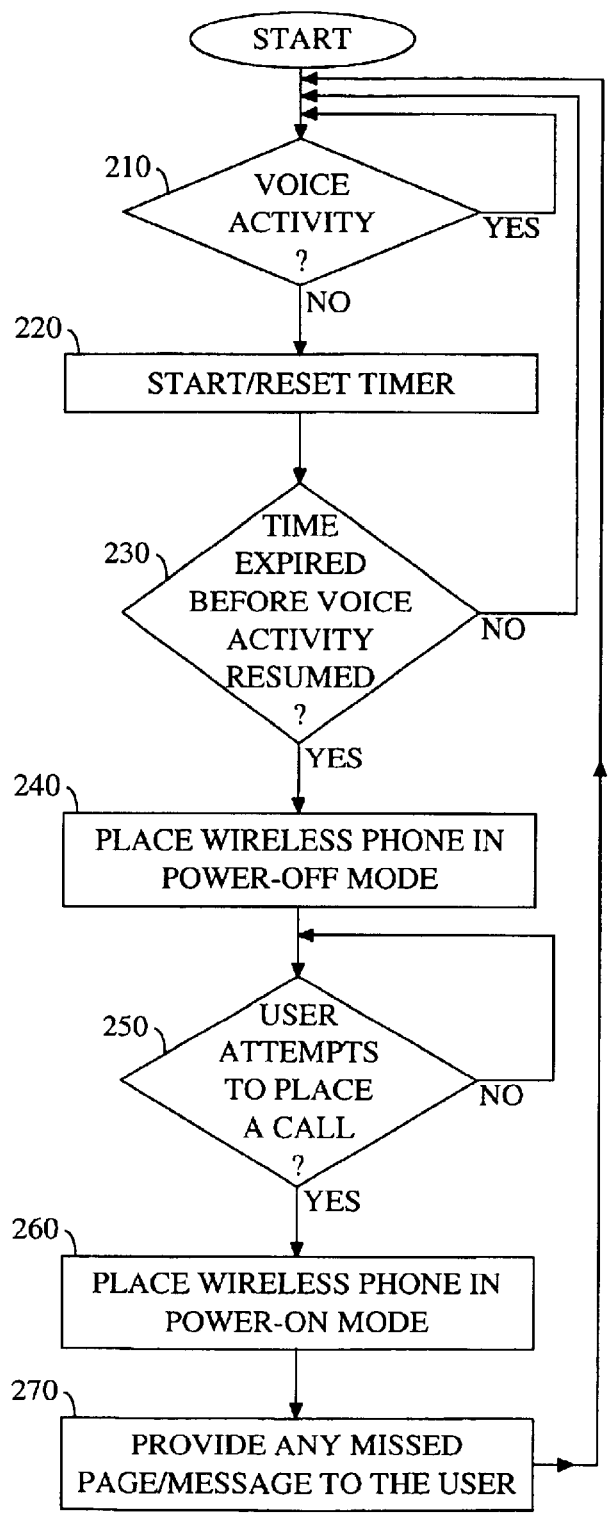
FIG. 2 is a flow diagram showing a method for implementing the power conservation system of the present invention on the portable electronic device shown in FIG. 1.

Referring now to FIG. 2, there is shown a flow diagram of a method 100 for implementing the power conservation system of the present invention on electronic device 10. In step 210, controller 32 waits for the cessation of voice activity on wireless telephone 30. Following cessation of voice traffic activity on wireless telephone 30, the controller 32 resets timer 34 in step 220. In step 230, the controller 32 determines whether the timer has expired (i.e., whether the timer has reached the predetermined period of time following cessation of voice traffic activity required to invoke the power-off state) before resumption of any further voice traffic activity on wireless telephone 30. If further voice traffic activity occurred between the time that time 34 was reset in step 220 and the expiration of timer 34, then the process returns to step 210 where controller waits again for an event indicating cessation of voice traffic activity. Alternatively, if no voice traffic activity occurred between the time that time 34 was reset in step 220 and the expiration of timer 34, then controller 32 places wireless telephone 30 in the power-off mode in step 240.

Once wireless telephone 30 is placed in the power-off mode in step 240, the system waits in step 250 until the user begins inputting a telephone number onto keypad 50, until the user attempts to place a call after inputting a number or recalling a number from memory by pressing a SEND key (also not shown) on keypad 50, or until some other user activity associated with wireless telephone 30 used to trigger the transition from the power-off state to the power-on state occurs, as described above. When such an event occurs, wireless telephone 30 is placed in the power-on mode in step 260. In this mode, the wireless telephone can receive incoming calls, places outgoing call, and optionally receive pages. In a particularly preferred embodiment, in step 270, information representative of any pages sent to wireless telephone 30 between steps 240 and 260 are provided to the user. After step 270, the system proceeds back to step 210, where controller 32 waits for the cessation of voice activity on wireless telephone 30.

The previous description of the preferred embodiments is provided to enable any person skilled in the art to make or use the present invention. Various modifications to the embodiments described above will be readily apparent to those skilled in the art, and the generic principles defined herein may be applied to other embodiments without the use of inventive faculty. Thus, the present invention is not intended to be limited to the methods and apparatuses shown herein but is to be accorded the widest scope consistent with the claims set forth below.

What is claimed is:

1. A system for reducing power consumed by an integrated electronic device that includes a personal data assistant (PDA) unit and a wireless telephone integrated in a common housing, wherein a common display on the housing is used for displaying messages from both the PDA and the wireless telephone to a user, comprising:

a controller, coupled to the wireless telephone, that places the wireless telephone in a power-off state after expiration of a predetermined period of time following cessation of voice traffic activity on the wireless telephone;

wherein the wireless telephone is unable to receive an incoming call when the wireless telephone is in the power-off state;

wherein the controller switches the wireless telephone from the power-off state to a power-on state if during operation in the power-off state, a user begins an attempt to place an outgoing call with the wireless telephone;

wherein the PDA is operable to receive information from the user through the display and display information to the user on the display when the wireless telephone is in the power-off state; and wherein the wireless telephone includes a pager that is unable to receive incoming pages when the wireless telephone is in the power-off state.

2. The system of claim 1, wherein, upon transition from a previous power-off state to a current power-on state, information representative of pages sent to the wireless telephone between cessation of a previous power-on state and initiation of the current power-on state are provided to the user.

3. The system of claim 2, wherein the predetermined period of time is selected from the group consisting of 30 minutes, 60 minutes and 120 minutes.

4. The system of claim 3, wherein the predetermined period of time is selectable by the user.

* * * * *